United States Patent [19]

Oliemuller

[11] 4,415,064
[45] Nov. 15, 1983

[54] SPEEDOMETER CABLE LUBRICATION TOOL

[76] Inventor: Casey Oliemuller, 1209 Orchid Rd., Warminster, Pa. 18974

[21] Appl. No.: 293,031

[22] Filed: Aug. 14, 1981

[51] Int. Cl.³ .......................... F16N 1/00; F16N 13/08
[52] U.S. Cl. ................................ 184/15 R; 184/105 R
[58] Field of Search ..................... 184/15 R, 15 A, 14, 184/6, 1 R, 1 E, 6.18, 105 R, 105 B

[56] References Cited

U.S. PATENT DOCUMENTS

| 2,178,058 | 10/1939 | West | 184/105 X |
| 2,681,711 | 6/1954 | Sievenpiper | 184/105 R |
| 3,101,812 | 8/1963 | Mercer | 184/105 R |
| 3,283,854 | 11/1966 | Self | 184/105 R |
| 3,731,764 | 5/1973 | Workman | 184/15 R |
| 3,884,329 | 5/1975 | Steffen | 184/15 R X |

Primary Examiner—David H. Brown
Attorney, Agent, or Firm—John J. Simkanich

[57] ABSTRACT

A tool for coupling to an end of an encased speedometer cable on an automobile or other motor vehicle in sealing engagement therewith for applying grease or other lubrication into that end of the speedometer cable under pressure while making rotational coupling with a drive member for rotating the cable from a protruding shaft portion of the tool for causing the lubrication to walk up the cable.

20 Claims, 5 Drawing Figures

SPEEDOMETER CABLE LUBRICATION TOOL

BACKGROUND OF THE INVENTION

This invention relates to special purpose hand tools for mobile equipment, and specifically to tools for use in the lubrication of automotive speedometer cables and the like.

Flexible cable assemblies are used in many applications in the automobile, aircraft, boating and farm equipment industries for controlling equipment or transferring power. One specific application is a speedometer cable which transfers rotational motion from a small shaft on a transmission to another shaft on a speedometer.

These cables are typically made of fine flexible rod reinforced with a wire winding and operate within an outer protective casing which performs the additional function of acting as a guide member. The cable rotates or otherwise moves within the casing and must be lubricated. If no lubrication is present, the friction created between the cable and the casing causes a binding or hopping operation of the cable and eventually the cable breaks.

The need to relubricate speedometer cables is quite common in the automotive industry, and especially with new cars produced on mass production lines with high-speed equipment and components supplied from independent suppliers which very often undergo long periods of storage before use. On many new cars the speedometer cables are very often installed with the lubrication insufficiently applied or partially dried out from a long period of storage. It is very often necessary to lubricate speedometer cables after only 10,000 miles of use.

With the modular design of automobiles and the compact assembly and sub-assembly of dashboards, engines and other portions of the automobile, it is very often quite difficult if not impossible for a mechanic to manipulate equipment under the dashboard or in the engine compartment to perform such duties as lubricating a speedometer cable. The dashboard end of a speedometer cable very often is difficult to access without substantially dismantling the dashboard and instrument package. This operation often takes more than one shop hour of labor time.

It is desirable to lubricate the speedometer cable from the transmission end thereby permitting the mechanic to break the cable loose from the transmission and force grease up the cable from that end. This process can eliminate more than one hour estimated shop time which it presently takes to dismantle the dashboard and instrument package. However, forcing grease into the transmission end of the speedometer cable does not do a sufficient lubrication job in itself as the grease is reluctant to walk up the cable and thereby the uper half of the cable is not lubricated. When excessive pressures are exerted on the grease the cable often bursts.

A number of cable lubricating tools have been provided in the prior art. These, however, have been devices which merely provide a sealed grease coupling to one end of the cable for forcing grease into that end of the cable. With such tools, the grease is able to travel only short distances along the cable.

Dannels, U.S. Pat. No. 3,268,032, provides a flexible cable lubrication tool comprising a coupling member 34 for joining a standard ball type grease fitting to the end of a flexible cable. A standard alemite grease fitting is then coupled to the ball type fitting for forcing grease into the end of the cable.

Self, U.S. Pat. No. 3,283,854, provides a cable lubricating tool which may become part of and may be permanently coupled to a cable. This lubricating tool includes a casing 21 which is fitted about a special tapered cable end structure 12. A tube 42 is fitted with a ball type grease fitting 46 for introducing grease into the casing 21 and thereby the cable from the side thereof and about the cable. The cable remains in its normal operational hook up. This lubricating tool is essentially a clamp-on device for introducing grease into a pocket through which the cable extends to provide a reservoir of grease to lubricate the cable at that point. No structure is provided by Self as part of high tool for mechanically operating the cable in any specific or intended way while applying grease.

Preszler, U.S. Pat. No. 2,515,611 provides a flexible shaft greasing fitting similar to that provided by Dannels. Preszler provides either a female or male cable end coupling housing 1 to which a ball type grease fitting 2 is attached. An alemite type grease fitting connects to the Preszler structure for forcing grease into the end of the cable casing. Preszler uses this structure for lubricating the speedometer cable at the speedometer end thereof, the upper end of the cable.

West, U.S. Pat. No. 2,178,058 provides a speedometer cable lubrication tool which lubricates the cable from the speedometer end thereof. This tool includes a housing 1 into which a speedometer cable end 27 is installed. A greasing block 12 is adjusted to clamp against the cable 27 via the screw 25 adjustment means and provide a pressure seal thereto. Greasing block 12 includes a channel 18 positioned to mate the end of the cable 27 casing. A ball type grease fitting 20 is screwed into the channel 18 which has been threaded on its end. Grease which enters the channel 18 through the fitting 20 is forced into the speedometer end of the cable 27, the upper end of the cable.

Sievenpiper, U.S. Pat. No. 2,681,711 teaches a lubricating device for lubricating the transmission end of a speedometer cable. The Sievenpiper device includes a housing which sealingly engages the transmission end of the speedometer cable by screwing onto the fitting on the transmission end of the speedometer cable. This housing is fitted at its end with a ball type grease fitting. Grease introduced through the ball type fitting travels along a narrow channel to the end of the speedometer cable and is forced into that end of the cable.

Steffen, U.S. Pat. No. 3,884,329 provides a speedometer cable lubricating device for lubricating the transmission end of a speedometer cable. This device operates similarly to the Sievenpiper device for introducing grease into that end of the cable. The Steffen apparatus includes coupling members for coupling to the transmission and of the speedometer cable and a grease fitting member connected to the coupling member.

These tools, while being able to introduce grease or lubrication into the end of a speedometer cable, and even certain ones of them being able to introduce grease into the transmission end of the speedometer cable, do not provide for an adequate lubrication of that cable as the grease is capable of being forced only a short way up the speedometer cable from its bottom end.

What is desired is a speedometer cable lubrication tool which will enable the grease to be carried up the length of the speedometer cable from its transmission end thereby greasing a substantially the entire length of the speedometer cable.

An object of the present invention is to provide a speedometer cable lubrication tool which will mate in sealing engagement with the transmission end of an automotive type speedometer cable.

A second object of the present invention is to provide this lubrication tool with a standard ball type grease fitting for introducing grease into that coupled end of the speedometer cable through the tool.

A further object of the present invention is to provide a means for rotating the speedometer cable with the tool.

A further object of the present invention is to provide this lubrication tool with the capability of rotating the end of the speedometer cable, in its normal direction of rotation, while interjecting grease under normal but not excessive pressures into the transmission end of the cable.

SUMMARY OF THE INVENTION

The objects of the present invention are realized in a speedometer cable lubrication tool. This tool attaches to the transmission end of an automatic-type speedometer cable by screwing onto the coupling at that end of the cable to provide a sealed attachment thereto.

A cylindrical housing is threaded on its outside diameter at one end for threading to the transmission coupling of the speedometer cable. This threaded end of the housing carries a tapered surface which protrudes beyond the threads and is intended to seat against the cable coupling to provide the sealing engagement.

A cylindrical bore or cavity extends the length of the housing from the threaded end on to which it opens. This cavity is accessed through the side wall of the housing by means of a ball type grease fitting. This cavity opens into the end of the cable to which the tool is coupled.

A drive shaft is positioned to ride within the cavity to protrude slightly beyond the end of the housing at the threaded end and significantly beyond the housing at the opposite end. This drive shaft is supported for rotation and carries on it sealing members. The end of the shaft at the threaded end of the housing is fitted with a coupling structure for engaging the end of the speedometer cable.

To lubricate a speedometer cable the tool is installed on the end of the speedometer cable so that a seal is created at the coupling and the shaft has engaged the speedometer cable. Following this operation an alemite grease fitting can engage the ball type grease fitting to introduce grease into the cavity. An electric motor or other rotation producing device is connected to the free end of the drive shaft, the one protruding significantly beyond the housing, and is operated to cause this shaft and the speedometer cable to rotate in the normal direction of operation of the speedometer cable. Grease introduced into the cavity of the tool under pressure fills the cavity and is forced into the speedometer cable. This grease is carried along the speedometer cable and up the cable housing by the helical configuration of the cable which is turned in its normal direction of operation causing the grease to travel along the cable and up the cable casing substantially the entire length of the cable.

DESCRIPTION OF THE DRAWINGS

The novel features and advantages of this invention will be readily understood from a reading of the following detailed description of the invention in conjunction with the attached drawings in which like numerals refer to like elements, and wherein.

DETAILED DESCRIPTION OF THE INVENTION

Figure 1:
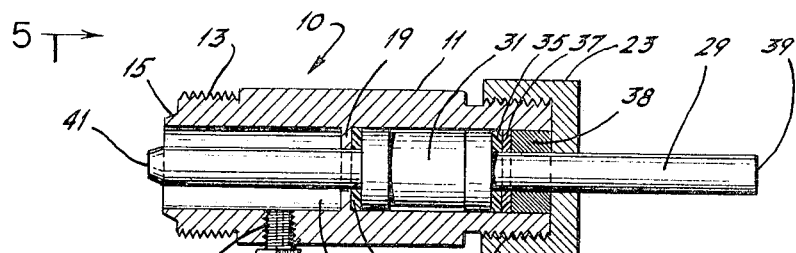
FIG. 1 shows a longitudinal cross sectional view of the speedometer cable lubrication tool.
Figure 5:
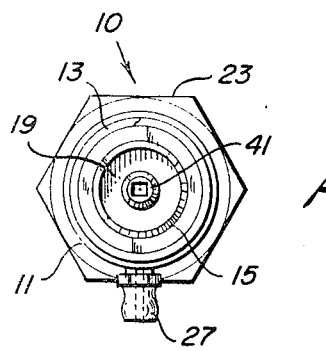
FIG. 5 is an end view of the lubrication tool taken as shown in FIG. 1.

A speedometer cable lubrication tool 10, FIG. 1, used in lubricating an automotive-type speedometer cable without removing the cable from its casing is provided. This device is intended to be screw attached to the transmission end of the speedometer cable in sealing engagement therewith. A hand grease gun with a standard alemite type fitting is used to inject grease or lubricant into the tool and into the end of the speedometer cable. By rotating a shaft in the tool equal to a speed of about 80 m.p.h. in a direction of normal operation of the speedometer cable, while injecting grease into the tool, grease is forced and carried up the length of the cable away from the tool by the helical configuration of the speedometer cable itself in a relatively short period of time.

The lubrication tool 10 includes a cylindrically shaped housing 11, FIG. 1, being threaded on its outside diameter at either end. The speedometer coupling end threads 13 of the housing 11 can have 18 threads per inch extending over about a distance of 5/16 of an inch. This thread pattern will enable coupling with General Motors type speedometer cables. Other threads may be used when coupling to other speedometer cables if needed.

Outboard from the coupling end threads 13 is a tapered shoulder 15 which provides sealing engagement with the speedometer cable when the tool 10 is coupled thereto and this tapered shoulder 15 which is truncated conically configured abuts the inside wall of a speedometer cable coupling.

A cylindrical cavity 17 or bore extends the entire length of the housing 11. This cavity 17 is concentric with the longitudinal center line of the housing 11 and extends entirely therethrough from the coupling end 13 on to which it opens to be circumferentially traversed by the tapered shoulder 15.

An annular shoulder 19 projects within the cylindrical cavity 17 at about mid-length, although the precise position of this shoulder 19 is not critical. This shoulder 19 provides opposed abutment faces on either side thereof which are normal to the center line of the cavity 17. The annular shoulder 19 is essentially a ring which is approximately 1/16 inch to ⅛ inch thick. The cavity 17 has a 17/32 inch inside diameter on the coupling 13 side of the shoulder 19 and a ½ inch on the other. Alternately, the cavity 17 can have a uniform diameter throughout its length.

The opposite end of the housing 11 from the coupling end 13 is the driving end 21 which is threaded a distance of about ½ inch with American standard thread at approximately 20 threads per inch. A threaded cap 23 mates with the driving end threads 21 and screws down to seal off the cavity 17 which opens onto that end 21.

A hole 25 is drilled and tapped through the wall of the cylindrical housing 11 at the coupling end 13 side of the annular shoulder 19. This hole 25 is fitted with a typical ⅛ inch ball-type grease fitting 27.

Positioned to operate within the cavity 17 and extending completely through the housing 11 is a drive shaft member 29, which is held in position by the end cap 23, and extends through a center hole in this cap 23.

Drive shaft member 29 is a 5/16 inch outside diameter shaft having an enlarged diameter section 31 at about its midlength. This enlarged diameter section 31 is slightly undersized to the inside diameter (about ½ inches) of the cylindrical cavity 17 but rides against the inside wall of that cavity 17 in operation. The enlarged diameter section 31 can have a uniform outside diameter or can be undercut slightly in the middle section thereof, leaving bearing surfaces at either end.

Drive shaft member 29 is inserted into the housing 11 from the drive end 21 to abut against the annular shoulder 19.

A first TEFLON washer 33 which has been fitted tightly on the coupling end of the shaft 29 to abut the enlarged diameter section 31 seats between the annular shoulder 19 on its drive side and the enlarged diameter section 31 to form a seal. Second and third TEFLON washers 35, 37 are mounted on the drive 21 end of the shaft member 29 to seat against the enlarged diameter section 31. A brass bushing 38 about 7/16 inch long seats within the cavity 17 and is held against the second and third TEFLON washers 35, 37 on the outside thereof by the end cap 23. This brass bushing 38 provides rotational support for the drive shaft member 29. The driving end 39 of the drive shaft member 29 having an outside diameter of 5/16" may be sized down or sized up for coupling to a suitable rotational drive member.

The coupling end 41 of the drive shaft member 29 has a square hole formed therein for coupling to or mating with the normally square end of a speedometer cable. This coupling end 41 is slightly chamfered and protrudes slightly beyond the tapered shoulder 15 of the housing 11. The end of a speedometer cable is fitted into this rectangular hole in the coupling end 41 of the drive shaft 29.

Lubrication tool 10, FIG. 1, may be manufactured from a number of materials each being quite suitable. It is important that the first, second and third washers 33, 35, 37 be of TEFLON or other materials suitable for sealing against grease or lubrication flow. The drive shaft member 29 with its enlarged diameter section 21, can be made of ordinary carbon steel. Cylinder housing 11, including its annular shoulder 19, can also be made of ordinary cotton steel, as can be the end cap 23. When these elements are made of steel, the bushing 38 is preferably of brass or bronze.

As an alternative, the housing 11, drive shaft member 29 with enlarged diameter section 31, and end cap 23 can be made of nylon, fiberglass or other similar material. Or they may be made of chrome steel or stainless steel. However, in mixing materials certain combinations of materials work better than others. In this regard, it is better to have steel riding against steel, or steel riding against fiberglass or nylon. It is immaterial, however, whether the housing 11 and end cap 23 are made of steel or nylon and the drive shaft 29 with its enlarged diameter 31 is made of the other material.

Figure 2:
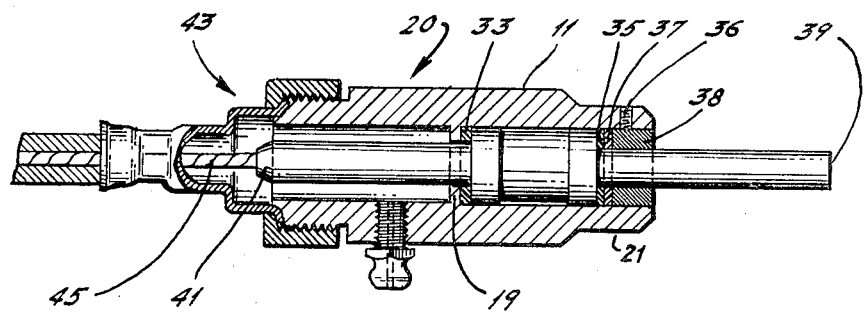
FIG. 2 shows a longitudinal cross section of the speedometer cable tool coupled to the end of a speedometer cable, this tool being another embodiment of the tool of FIG. 1.

A second embodiment 20 of the lubrication tool is shown in FIG. 2 attached to the transmission end coupling 43 of the speedometer cable. In the fully coupled state the coupling end 41 of the drive shaft member 29 engages the actual speedometer cable 45. This second embodiment 20 differs from the first embodiment 10 only as to the driving end 21 of the structure. The driving end 21 threads and end cap 23 of FIG. 1 are eliminated and the bushing 38 is press fit into the housing 11. A set screw 36 can be used to guarantee securement of the bushing 36. It is the press fit of this bushing 38 with or without set screw 36 which holds the drive shaft member 29 and its carried first, second and third TEFLON washers 33, 35, 37 into position with the first TEFLON washer 33 sealing against the annular shoulder 29 and the second and third TEFLON washers 35, 37 sealing against the bushing 38.

Figure 3:
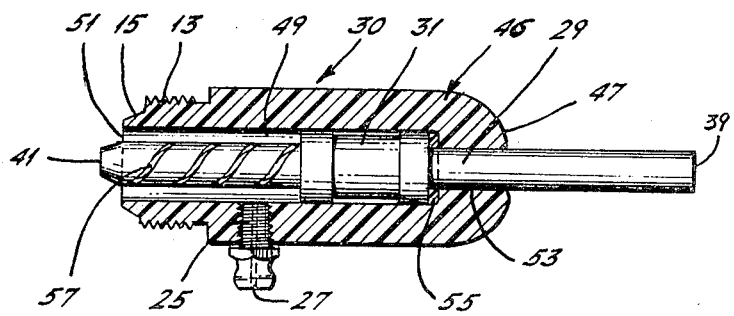
FIG. 3 is a longitudinal cross sectional view of another embodiment of the tool of FIG. 1.

A third embodiment 30 is shown in FIG. 3. Here, an essentially cylindrical housing 46 which may also be machined from steel, brass or bronze, or made of cast metal, is made of plastic, fiberglass or nylon material. The driving end 47 of this housing is formed as a continuous piece with the side walls to form a rounded end 47 to the housing 45. A cylindrical cavity 49 extends from the coupling end 51 of the housing 45 along its longitudinal center line. This cavity 49 has a uniform diameter of approximately ½ inch and terminates at the driving end 47 of the housing 45 in a squared-off shoulder. A small bore 53 approximately 5/16 inch in diameter extends through the domed driving end 47 of the housing along its longitudinal center line. A drive shaft member 29, similar to that of the embodiments of FIGS. 1 and 2, is positioned within the cavity 49 to have its driving end 39 extend through the small bore 53. This drive shaft member 29 includes a similar enlarged diameter section 31 which is seated against the closed end of the cavity 49 with a single fourth TEFLON washer 55 which has been positioned on the driving end of the drive shaft member 29 acting to seal the drive shaft member 29 and driving end 47 of the housing from grease seepage. Grease pressure within the cavity 49 seats the enlarged diameter section 31 and TEFLON washer 33 against the end shoulder of the cavity 49.

A ⅛ inch hole 25 has been drilled and tapped through the side wall of the housing 45 and a ball-type grease fitting 27 has been inserted therein. This hole 25 is positioned forward or toward the coupling end 51 of the housing from the enlarged diameter section 31 when this section 31 is fully seated with its TEFLON washer 55 against the dome driving end 47 of the housing 46.

The coupling end 51 of the housing 45 carries external threads 13 being American standard thread at 18 threads per inch, or other threads suitable for coupling to the proper speedometer cable coupling. A tapered shoulder 15 extends outwardly from the coupling end threads 13 as with the previous embodiments. This tapered shoulder 15 provides the sealing engagement with the mating speedometer coupling as previously discussed.

Also as previously discussed, a square hole has been formed in the coupling end 41 of the drive shaft member 29. This hole is of a size to receive a speedometer cycle 45 as in the embodiment in FIG. 2.

A helical groove spiraling in the same direction as the windings of the speedometer cable 45 seen in FIG. 3, extends along the outside of the coupling end of the drive shaft member 29. While this helical groove 57 can be eliminated, it tends to aid in feeding lubricant by causing a movement of the grease which has entered the cavity 49 (from the ball-type grease fitting 27) in the general direction of the coupling end 51 of the tool and in a helical flow pattern similar to what it undergoes once it has been introduced to the speedometer cable.

Figure 4:
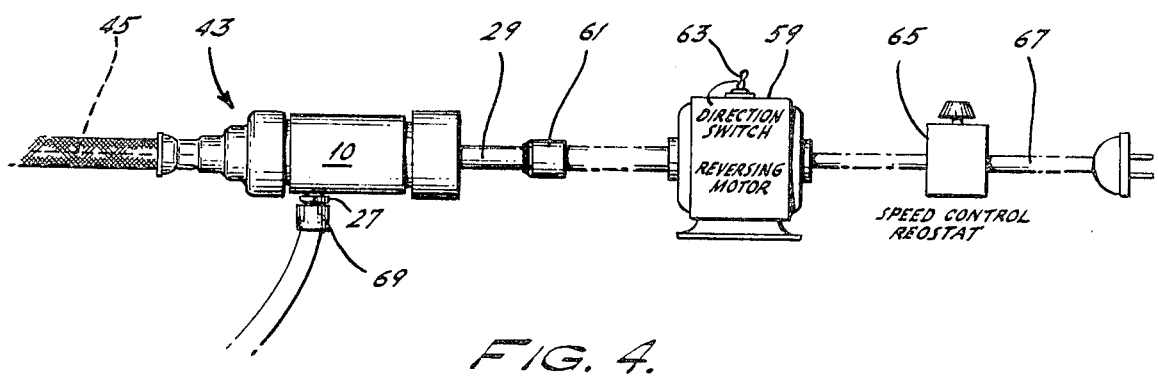
FIG. 4 is a block representation of the lubrication tool and associated equipment connected to lubricate a speedometer cable.

Any of the speedometer lubrication tool embodiments discussed hereinabove, as, for example, the tool 10, can be coupled to a speedometer cable 45 transmission end coupling 43 as shown in FIG. 4. A dual direction or reversing motor 59 is chucked or otherwise coupled via a coupling member 61 to the driving end of the shaft member 29. This motor has its direction switch 63 adjusted to drive the shaft 29, and thereby the speedometer cable, in its normal direction of rotation. With General Motors cars this is counter-clockwise. A speed control rheostat 65, inserted in the power line 67 to the motor 59, adjusts the voltage to the motor 59 to control the motor speeds to an equivalent of about 80 miles per hour on the vehicle speedometer. This speed control rheostat 65 may be adjusted and calibrated to actual speed seetings or the mechanical may look at the speedometer of the vehicle while the speedometer cable is being turned by the motor 59. With the speedometer cable turning at about 80 miles per hour, grease is injected into the tool 10 via the grease fitting 27 from a standard grease gun with alemite fitting 69. About 8 to 10 standard pumps on a hand-operated grease gun will provide a sufficient quantity of grease to the cable 45 and will, through the rotation of the cable 45, for about 30 seconds cause a traveling of this grease substantially up the entire length of the cable casing.

Many modifications can be made in the speedometer lubrication tool described above without deviating from the intent and scope thereof. Likewise, modifications can also be made in the system layout of FIG. 4 without deviating from the intent and scope thereof. It is intended, therefore, that the above description be taken as illustrative and not be interpreted in the limiting sense.

I claim:

1. A lubrication tool for an encased speedometer cable, said cable being disconnectable from a transmission to provide a free coupling and casing end thereof with the speedometer cable end projecting therefrom, comprising:
    means for providing a sealed connection with the end of said speedometer cable casing, said sealed connection means including a lubrication fitting; and
    means for rotatably coupling to said end of said speedometer cable, said rotatable coupling means being positioned within said sealed connection means and being capable of rotating said speedometer cable end.

2. The tool of claim 1 wherein said sealed connection means includes:
    a hollow housing having a cylindrical threaded portion at one end;
    a tapered surface on said housing at said threaded portion end; and
    wherein said lubrication fitting providing a structure to introduce lubrication into said hollow housing is adjacent said threaded portion end.

3. The tool of claim 2 wherein said rotatable coupling means includes:
    a shaft member extending through said hollow housing and protruding slightly beyond said threaded portion end of said housing.

4. The tool of claim 3 wherein said shaft member end at said housing threaded portion end includes a square hole into which said cable end fits in rotatable driving coupling therewith.

5. The tool of claim 4 wherein said shaft member also protrudes out of said housing at the end opposite said threaded portion end a significant distance.

6. The tool of claim 5 also including a seal at said opposite end of said housing said shaft member extending therethrough a significant distance.

7. The tool of claim 6 also including:
    means for causing rotation coupled to said shaft member end which extends said significant distance; and
    means for controlling the speed of rotation of said rotation causing means.

8. The tool of claim 6 wherein said housing threaded portion is on the outside of said housing, this threaded portion intended to engage said coupling at said free end of said cable casing.

9. The tool of claim 8 wherein said housing has a cylindrical cavity extending longitudinally therethrough from said threaded portion end to which it opens.

10. The tool of claim 9 wherein said tapered surface is conically shaped and extends at said threaded portion end of said housing about said cavity opening and outwardly beyond said threaded portion.

11. The tool of claim 10 also including a bearing upon which said shaft rotates said bearing being positioned at said opposite end of said housing.

12. The tool of claim 11 wherein said bearing is a closed end of said housing through which said shaft extends.

13. The tool of claim 11 wherein said bearing is a bushing positioned in said cylindrical cavity through which said shaft extends.

14. The tool of claim 13 wherein said bushing is press fit at the end of said cavity opposite said cable.

15. The tool of claim 13 wherein said cavity opens through said housing at said opposite end.

16. The tool of claim 15 wherein said shaft includes an enlarged diameter portion within said cavity which enlarged diameter portion rides against the walls of said cavity.

17. The tool of claim 16 wherein said seal is a first TEFLON washer positioned on said shaft against a first side of said enlarged diameter portion.

18. The tool of claim 17 also including a second TEFLON washer and also including a third TEFLON washer on said shaft against the other side of said enlarged diameter portion.

19. The tool of claim 18 also including an annular shoulder within said cavity away from said threaded portion end beyond said lubrication fitting, said shaft enlarged diameter portion and third TEFLON washer being positioned to abut said shoulder on its side away from said threaded portion end.

20. A process for lubricating an encased speedometer cable from the transmission end thereof comprising the steps of:
    introducing lubricant into said transmission end of said cable casing under pressure; and
    rotating said cable end in the direction of normal rotation while concurrently introducing more lubricant.

* * * * *

UNITED STATES PATENT AND TRADEMARK OFFICE
CERTIFICATE OF CORRECTION

PATENT NO. : 4,415,064

DATED : November 15, 1983

INVENTOR(S) : Casey Oliemuller

It is certified that error appears in the above-identified patent and that said Letters Patent is hereby corrected as shown below:

Column 2, line 15, "high" should be --has--

Column 5, line 61 "cotton" should be -- carbon--

Column 6, line 22 "29" should be --19--

Column 7, line 1 "cycle" should be --cable--

Column 7, line 28 "mechanical" should be --mechanic--

Signed and Sealed this

Eighth Day of May 1984

[SEAL]

Attest:

Attesting Officer

GERALD J. MOSSINGHOFF

Commissioner of Patents and Trademarks